(12) United States Patent
Cerniar

(10) Patent No.: US 8,035,553 B2
(45) Date of Patent: Oct. 11, 2011

(54) SYSTEM AND METHOD FOR SITE CALIBRATION OF A SURVEYING DEVICE

(75) Inventor: Mario Cerniar, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 203 days.

(21) Appl. No.: 12/483,949

(22) Filed: Jun. 12, 2009

(65) Prior Publication Data

US 2010/0315286 A1 Dec. 16, 2010

(51) Int. Cl.
*G01S 19/45* (2010.01)
*G01S 19/51* (2010.01)
(52) U.S. Cl. ............... 342/357.28; 342/357.34
(58) Field of Classification Search ............. 342/357.23, 342/357.25, 357.34, 357.62, 174, 357.28; 700/251
See application file for complete search history.

(56) References Cited

U.S. PATENT DOCUMENTS

| | | | |
|---|---|---|---|
| 5,471,218 A | 11/1995 | Talbot et al. | |
| 5,614,913 A | 3/1997 | Nichols et al. | |
| 5,774,826 A | 6/1998 | McBride | |
| 5,978,744 A | 11/1999 | McBride | |
| 5,986,604 A | 11/1999 | Nichols et al. | |
| 6,343,254 B1 | 1/2002 | Kirk et al. | |
| 6,369,755 B1 | 4/2002 | Nichols et al. | |
| 6,370,476 B1 | 4/2002 | McBride | |
| 6,727,849 B1 | 4/2004 | Kirk et al. | |
| 6,732,051 B1 | 5/2004 | Kirk et al. | |
| 2008/0100506 A1 | 5/2008 | Gradine et al. | |
| 2009/0220144 A1* | 9/2009 | Mein et al. | 382/154 |

* cited by examiner

*Primary Examiner* — Dao Phan
(74) *Attorney, Agent, or Firm* — Dickstein Shapiro LLP

(57) ABSTRACT

A system and method for site calibration of a controller is provided. In one embodiment, a method may include determining coordinates of a point in a first coordinate system based on at least one measurement by a surveying device, determining coordinates of the point in a second coordinate system based on data provided by a global positioning device, and calculating a transformation of the first coordinate system relative to the second coordinate system based on the coordinates determined for the point. The method may further include calibrating the controller based, at least in part, on the transformation.

22 Claims, 6 Drawing Sheets

SYSTEM AND METHOD FOR SITE CALIBRATION OF A SURVEYING DEVICE

FIELD OF THE INVENTION

The present invention relates in general to surveying systems and more particularly to a system and method for site calibration of a surveying device.

BACKGROUND

Conventional surveying methods are typically based on local coordinate systems. A surveyor in the field will often record survey locations in a local coordinate system. Coordinates of a point in the local coordinate system are different than coordinates for the point in the global coordinate system. It may be difficult to interpret measurement results when measurements are performed in two coordinate systems.

Coordinates of local coordinate systems are typically expressed as Northing, Easting and Height/Elevation values, or Southing, Westing and Height/Elevation values, with respect to a survey center (SC). FIG. 8 illustrates a local coordinate system S with reference to ellipsoid surface E of a global coordinate system. In one conventional approach, horizontal coordinates in the local coordinate system S may be determined by a projection of $\pi(S, E)$ on a location measured with reference to ellipsoid surface E, onto a tangential plane $\tau$. Thus, a point or location $P_E$ in a global coordinate system may be referred to as a point $P_S=\pi(S, E)P_E$ in a local coordinate system S under a projection of $\pi(S, E)$. Conventional systems typically calculate projections post measurement of data. Further, local coordinate systems and global coordinate systems may have different origins, scales and orientations. Conventional systems do not facilitate use of the data from local and global coordinate systems. This can lead to measurement and/or survey errors. Conventional systems are additionally susceptible to error when improperly marked locations or points in a local coordinate system are employed.

Thus, there exists a need to facilitate use of measurement data associated with local and global coordinate systems. Further, there exists a need for a surveying system and method which allows for coordinates to be determined in the coordinate systems including calibration of surveying devices.

BRIEF SUMMARY OF THE INVENTION

Disclosed and claimed herein are a system and method for site calibration of a controller. In one embodiment, a method includes determining coordinates of a point in a first coordinate system based on at least one measurement by a surveying device, determining coordinates of the point in a second coordinate system based on data provided by a global positioning device and calculating a transformation of the first coordinate system relative to the second coordinate system based on the coordinates determined for the point. The method further includes calibrating the controller based, at least in part, on the transformation.

Other aspects, features, and techniques of the invention will be apparent to one skilled in the relevant art in view of the following detailed description of the invention.

DETAILED DESCRIPTION OF EXEMPLARY EMBODIMENTS

Figure 1:
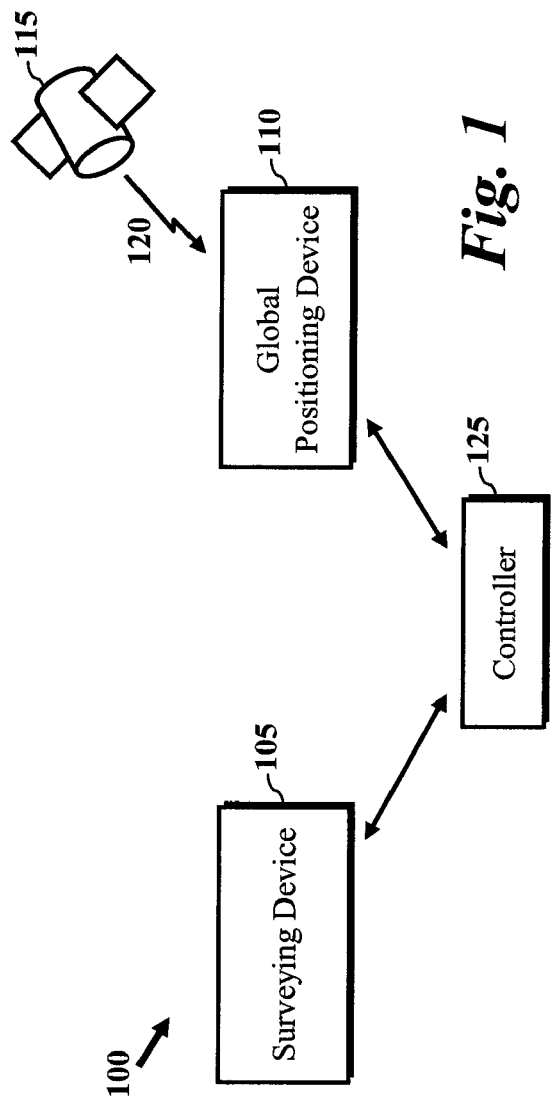
FIG. 1 depicts a simplified system diagram according to one embodiment of the invention.

One aspect of the present invention is directed to site calibration of a surveying system. In one embodiment, site calibration may allow for transformation of coordinates in a first coordinate system to coordinates for the point in a second coordinate system. The surveying system may be configured to perform a site calibration by determining coordinates in first and second coordinate systems and calculating a transformation between the coordinate systems for a surveying site. By way of example, a controller of the surveying system may perform a site calibration based on coordinates measured by a surveying device corresponding to a local coordinate system and coordinates determined by a global position device corresponding to a global coordinate system. Once a site calibration has been completed, the controller may transform coordinates from the local coordinate system relative to the global coordinate system. Thus, in an exemplary embodiment, the controller may be configured to perform a transformation of coordinates in a global coordinate system relative to a local coordinate system (e.g., WGS 84 coordinates may be transformed relative to northing, easting, and elevation values of a local coordinate system). The surveying system further allows for setup of a first device (e.g., surveying device) for measuring coordinates in the first coordinate system and transformations relative to the first and second coordinate systems. In that fashion, coordinates may be determined by the controller for the first and second coordinate systems at the same time. Advantages of the invention can include reduced setup time for a surveying device, elimination of setup and/or measurement errors and allowing for station setup and a transformation calculation simulatnesouly.

According to one embodiment of the invention, transformation of coordinates of the first coordinate system relative to the second coordinate system may be calculated without the need for switching between instruments. The system may include a surveying device, such as a total station, for performing one or more surveying measurements and a device for determining global position, such as a global positioning receiver. The system may further include a controller interoperating with the surveying device and the global positioning receiver.

In another embodiment, a controller of the surveying system may be configured to interoperate with components to perform a site calibration. As used herein, a site calibration refers to measurement of data for one or more points and calculating a transformation between two coordinate systems. The site calibration may be based on and/or initiated by set up of a first surveying device in combination with a calculation of a transformation. In one embodiment, site calibration may be performed without having to switch between instruments or defining different point names for both measurements of the same physical point. Site calibration of one or more components of the integrated surveying system may be transparent to users and/or operators, such that the transformation is performed by surveying equipment. Further, the system may be provided to support interoperation of a controller and one or more surveying devices. One advantage of such a system may be that setup is facilitated for a surveying device and/or performing surveying measurements.

According to another embodiment, a process may be provided for site calibration including calculating a transformation between first and second coordinate systems. The process may be based on measurements determined by a surveying device and a global positioning device. The process may be performed for determination of a transformation calibration for the surveying site during setup of the surveying device. The process may allow for measurement of point data to determine coordinates in the first and second coordinate systems concurrently. As a result, time for conducting a survey may be reduced as data for points may be measured by the system for both coordinates systems. Thus, the process may increase surveying workflow.

According to another aspect of the invention, a surveyor and/or user may utilize a controller and the global positioning receiver for performing measurements in the first and second coordinate systems. The controller may allow for measuring coordinates of a point within the first and second coordinate systems, that is coordinates for the same physical point, to have a single reference and/or identifier. In that fashion, a surveyor is not required to match names for points measured in the first and second coordinate systems. It should also be appreciated that the controller may allow for the point to have multiple names based on user input in certain embodiments. The surveying system may be configured to transform coordinates between the first and second coordinates systems using a transformation. Transformation between the coordinate systems may be based on measurement of one or more control points. When a complete transformation has been determined, measurement points in one coordinate system may be output as coordinates in a second coordinate system. In that fashion, measurements that may not be determined with a conventional optical device due to elevation or obstructions may be made with a global positioning receiver. Further, a complete transformation may allow for one man operation of the surveying system.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, etc. The code segments may be downloaded via computer networks such as the Internet, Intranet, etc.

Referring now to the drawings, FIG. 1 illustrates a simplified system diagram of a surveying system configured for site calibration according to one or more embodiments of the invention. As shown in FIG. 1, system 100 includes surveying device 105 which may be configured to perform one or more surveying measurements, such as angle and distance measurements. Surveying device 105 may include one or more components for performing these measurements. In one embodiment, surveying device 105 may correspond to one or more of a total station, theodolite, registering tacheometer and surveying instrument in general for providing angle and distance measurements. Surveying device 105 may interoperate with controller 125 via a wired or wireless communication link. For example, measurement data determined by surveying device 105 may be transmitted to controller 125. Alternatively, or in combination, controller 125 may transmit one or more control signals to surveying device 105 to perform a surveying measurement and/or interoperate with another device, such as global positioning device 110. Controller 125 may relate to one or more of a data collector, portable field computer and device in general for controlling surveying devices and/or storage of data.

System 100 may further include global positioning device 110 which may be used to provide positioning data based on a global coordinate system. In one embodiment of the invention, global positioning device 110 may be configured to receive positioning data from one or more positioning data sources, such as a satellite. Positioning data, shown as 120, from positioning data source 115 may relate to one or more of global navigation satellite system (GNSS) data, global positioning system (GPS) data and geo-spatial positioning data in general. Positioning data source 115 may correspond to one or more sources including satellites and positioning data sources in general, such as a wireless communication network. Global positioning device 110 may be configured to transmit positioning data to surveying device 105 and/or controller 125.

In one embodiment, measurement data and/or coordinates determined by surveying device 105 and global positioning device 110 may be used to perform a site calibration and calculation of a transformation between first and second coordinate systems by controller 125. As will be described in further detail below, controller 125 may be configured to calculate a complete transformation of a first coordinate system to a second coordinate system. Once a transformation is complete, coordinates determined from surveying device 105 and global positioning device 110 may be interchangeable by controller 125. According to another embodiment, site calibration may be part of the setup for surveying device 105.

While the system of FIG. 1 employs global positioning device 110, it may also be appreciated that other positioning devices (not shown in FIG. 1) may be employed to determine coordinates and/or measurement data for site calibration of controller 125. For example, controller 125 may be configured to employ coordinate or positioning data received from a wireless communication unit (not shown in FIG. 1). As such, controller 125 may include wireless communication components for communication over wired and/or wireless networks (e.g., an internet network, subscription based communication network, etc.), In one embodiment, controller 125 may be configured to collect data such as user records, global positioning device data, user characteristics, and/or field data. In that fashion, user settings and/or user data may be loaded prior to a survey or site calibration. Controller 125 can be any type of processor such as a microprocessor, field programmable gate array (FPGA) and/or application specific integrated circuit (ASIC). It may also be appreciated that data received by controller 125 may be stored in memory (not shown), such as one of a ROM and RAM memory.

Figure 2:
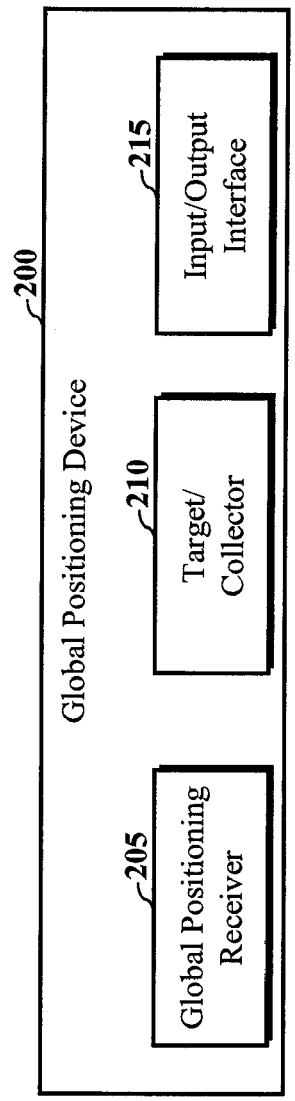
FIG. 2 depicts a simplified block diagram of a global positioning device according to one embodiment of the invention.

Referring now to FIG. 2, a simplified block diagram is shown of the global positioning device of FIG. 1 according to one embodiment. Global positioning device 200 (e.g., global positioning device 110) may be utilized by a surveyor to determine coordinates and surveying data for one or more points of interest based on a global coordinate system. Similarly, global positioning device 200 may be utilized to perform a site calibration. As shown in FIG. 2, global positioning device 200 (e.g., global positioning device 110) includes global positioning receiver 205, target/collector 210, and input/output interface 215. In one embodiment, global positioning device 200 may be utilized to mark one or more points in a surveying site. In that fashion, global positioning device 200 may be utilized to mark a control point or foresight for a surveying device.

Positioning receiver 205 may be configured to receive positioning data from a positioning source (e.g., positioning source 115) associated with one or more points in a surveying site. Positioning data received by positioning receiver 205 may correspond to one or more of global navigation satellite system (GNSS) data, global positioning system (GPS) data and geo-spatial positioning data in general. Target/collector 210 may be used for interoperation of global positioning device 200 with a surveying device (e.g., surveying device 105). For example, target/collector 210 may be employed by the surveying device to determine one or more of angle and distance measurements for a point marked by target/collector 210. Input/output interface 215 may be configured for wired or wireless communication with a controller (e.g., controller 125) and/or surveying device (e.g., surveying device 105). Positioning data received by global positioning receiver 205 may be provided to a controller by input/output interface 215.

Figure 3:
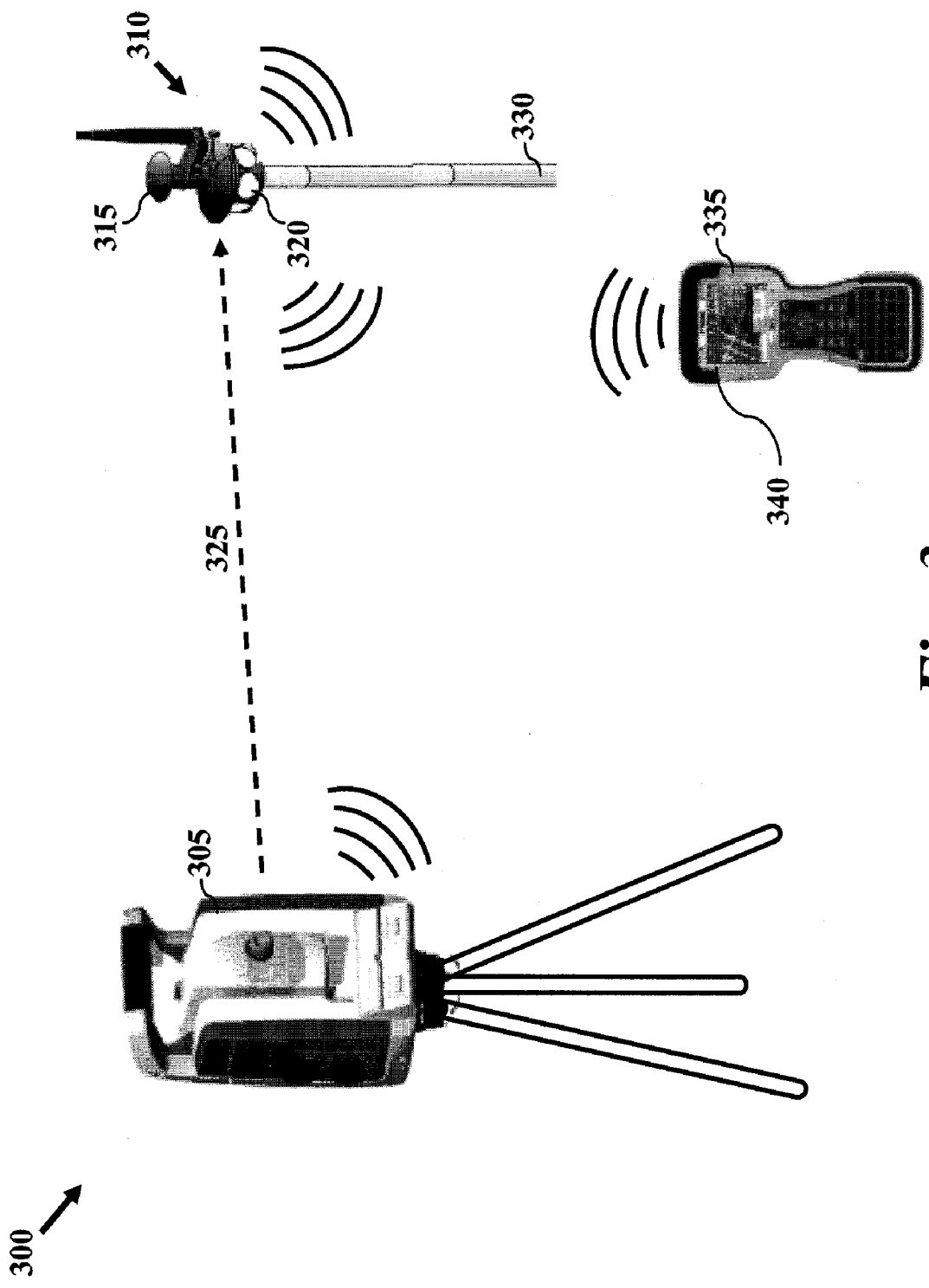
FIG. 3 depicts a graphical representation of an integrated surveying system according to one embodiment of the invention.

Referring now to FIG. 3, a graphical representation is shown of an integrated surveying system according to one embodiment of the invention. As shown in FIG. 3, integrated surveying system 300 includes total station 305 (e.g., surveying device 105), pole mounted global positioning device 310 (e.g., global positioning device 110) and controller 335 (e.g., controller 125). Total station 305 may be employed to determine one or more surveying measurements (e.g., distance, angle, etc.). Total station 305 is mounted to a tripod. A user can position pole 330 for measurements by total station 305 with target/collector 320. A surveyor may utilize global positioning device 310 with controller 335 (e.g., controller 125), which may also be mounted to the pole, to determine coordinates for one or more points in a survey site. Similarly, global positioning device 310 can include a global positioning receiver 315 configured to receive positing data and/or timing data, and to determine coordinates in a global coordinate system. Coordinate data may be determined for the point in the first and second coordinate systems using global positioning device 310 and total station 305. According to another embodiment, total station 305 may be placed at a known or unknown location.

Total station 305 may be configured to generate a distance measurement signal, shown as 325, such as a beam of light, electromagnetic transmission, etc. Based on signal 325 from total station 305, distance and/or angle measurements may be performed. Setup of total station 305 may be performed with one control point measurement when total station 305 is arranged on a known location. When total station 305 is positioned at an unknown or unmarked location, at least two control point measurements are required for setup of the total station.

One advantage of the invention is to allow for a user to determine coordinate data for the point in at least two coordinate systems at the same time. Another advantage of the global positioning device may be to allow for operation by global positioning device 310 and controller 335 without total station 305 when transformation has been determined. By way of example, one or more measurements may be determined by controller 335 based on data received by global positioning device 310. Accordingly, global positioning device 310 and controller 355 may be operated to collect coordinate data for one or more points based on global positioning data. Positioning data may be collected and/or received by controller 335. Thus, when line of sight, or optical measurements by total station 305 are not possible and a complete transformation has been performed by the controller 335, global positioning device 310 may be operated to determine coordinates in the global coordinate system. Controller 335 is configured to transform coordinates in the global coordinate system to a local coordinate system based on setup and/or transformation. Display 340 of controller 335 may be configured to display the transformed coordinates.

Controller 335 includes display 340 for outputting information to the surveyor and may be configured to alert a user when one or more site calibrations are not performed. Controller 335 can restrict storing of surveying measurements when certain site calibrations are not performed.

In certain embodiments, coordinates in a local coordinate system may be transformed to a global coordinate system and presented on display 340, as will be discussed below in further detail below with respect to FIG. 5. Controller 335 and/or global positioning device 310 may be configured to alert an operator when a survey pole with the receiver is positioned at a predefined or displayed location on display 340.

Figures 4, 5:
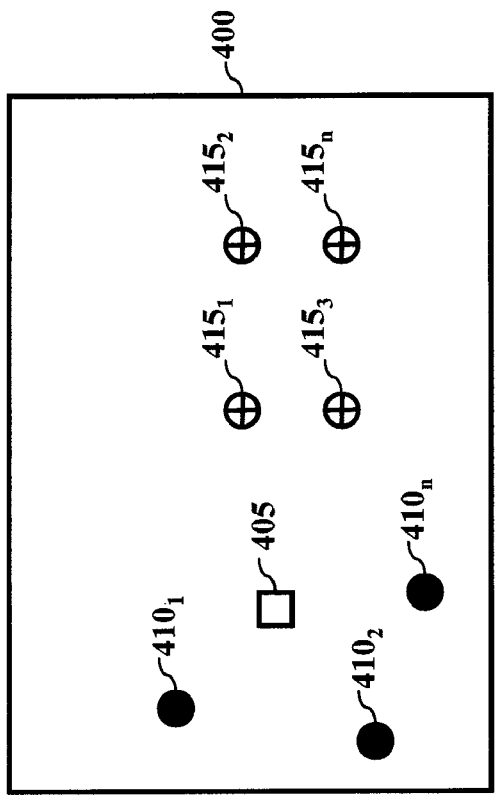
FIG. 4 depicts a graphical representation of measurement points of a survey site according to one embodiment of the invention.
FIG. 5 depicts a graphical representation of a controller display according to one embodiment of the invention.

Referring now to FIG. 4, a graphical illustration is shown of a survey site. According to one embodiment of the invention, site calibration may be initiated at a known observation point in a survey site such as point 405. For example, surveying point 405 may have been previously measured and marked by a total station (e.g., survey device 105). In another embodiment, point 405 may be unknown to the surveying system. Calculation of a transformation between two coordinate systems requires common observation points (e.g., points with coordinates in both coordinate systems). To calculate a complete transformation, at least three points are required. However, site calibration may be performed using a single observation point to provide an offset between the coordinate systems. Employing two observation points for site calibration would additionally provide scale and orientation values. According to another embodiment of the invention, a user may employ more than three transformation points to provide increased precision and detection of errors.

Site calibration may be performed using one or more control points shown as $410_{1-n}$. A control point refers to a physical point in a survey site with known or unknown coordinates in the local coordinate system. Station setup for a total station may be calculated based on one or more measurements with control points to determine position of the total station and coordinate values such as Northing, Easting and Elevation values. Once setup of the total station is complete, measurements may then be taken of one or more foresights $415_{1-n}$. In one embodiment, coordinates of three points are required for a complete transformation. According to another embodiment of the invention, additional points may be added to the transformation. In one embodiment, range for a site calibration may be limited. For example, site calibration may require recalibration or adding additional transformation points when a range or predetermined area has been exceeded.

According to one embodiment, additional control points may be added for station setup to account for errors during station setup and/or an incorrect transformation. Additional control points may be employed to apply a transformation to an area that is not defined by the previously measured control points. As will be described below with reference to FIG. 7 in more detail, additional control points may be measured and the transformation may be recalculated based on the additional control points. Thus, additional control points may be measured for topographical surveys. For stakeout surveying, however, additional control points would not be utilized after a complete transformation is determined. Coordinate values could change based on a recalculation of the transformation. Thus, the controller may be configured to restrict recalculation of a transformation during a stakeout survey.

Referring now to FIG. 5, a graphical representation is shown of a controller display according to an exemplary embodiment of the invention. As show in FIG. 5, display window 500 may provide coordinate data for one or more points which are utilized or to be measured by a surveying system according to the invention. Display window 500 may correspond to a controller display (e.g., display 340) and may present one or more point names, shown as 505. Coordinates for a point in a first coordinate system are shown as 510, and coordinates for the point in a second coordinate system are shown as 515. Display window 500 may be employed to display data for points as they are determined. Data for points which have been previously determined and/or from a previous survey may also be displayed. For example, data may be output for coordinates of a first coordinate system only. In one embodiment, display window 500 may provide alert messages indicating that additional transformation points may be required. Further, alert messages may indicate that previously calculated coordinates may change due to re-calculation of the transformation. In addition, the controller may be configured to display only coordinates in a single coordinate system.

Figure 6B:
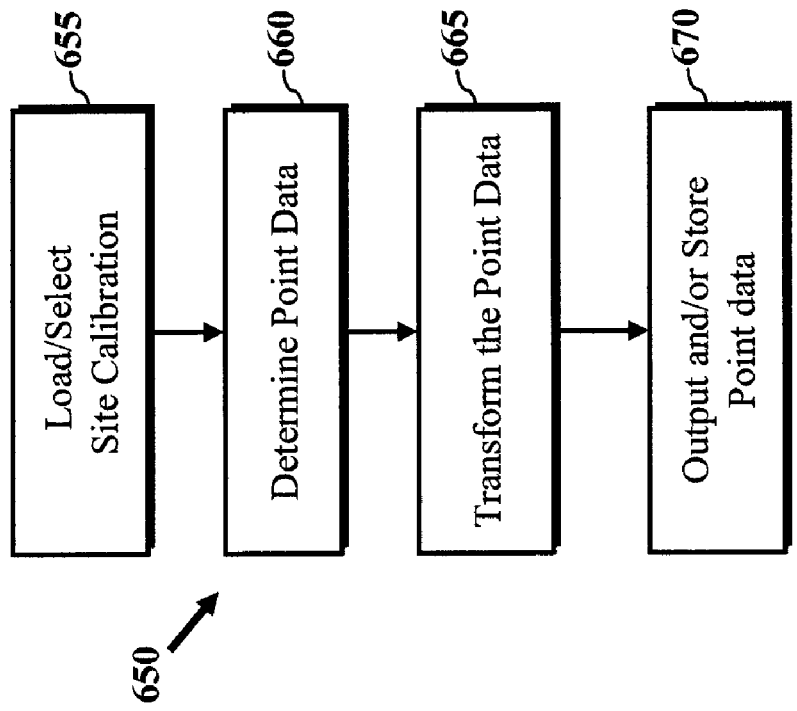
FIGS. 6A-6B depict processes for site calibration of a surveying device according to one or more embodiments of the invention.
Figure 6A:
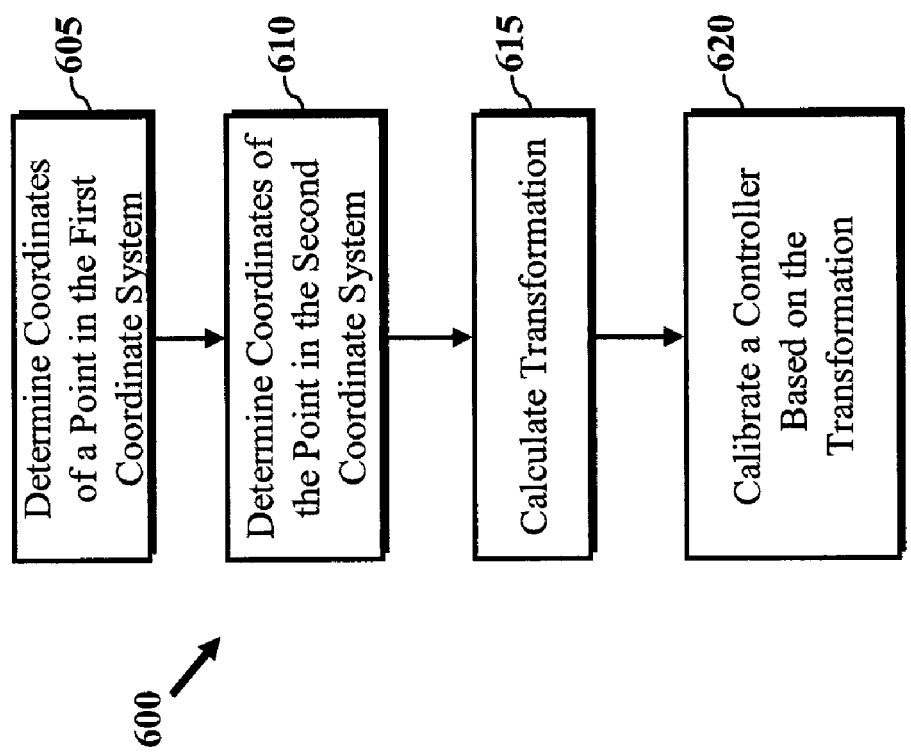

Referring now to FIGS. 6A-6B, processes are shown for performing site calibration for a surveying system according to one or more embodiments of the invention. Referring first to FIG. 6A, process 600 may be initiated by measuring coordinates of a first coordinate system by a surveying device (e.g., surveying device 105) at block 605. In one embodiment, process 600 may be performed during setup of the surveying device. Measurements of the point may be determined by positioning a surveying device at a known or unknown point (e.g., point 405) and global positioning device 110 at a measurement point (e.g., point $405_{1-n}$). Coordinates for a second coordinate system may be determined by global positioning device (e.g., global positioning device 110) at block 610.

According to one embodiment, coordinates determined in blocks 605 and 610 may be determined at or relatively at the same time. When multiple points are to be measured, blocks 605 and 610 may be repeated for each point. Thus, coordinates may be determined for a point in the first and second coordinate systems. Coordinates may also be determined for additional points in the first and second coordinate systems. Measurement data determined in blocks 605 and 610 may be provided to a controller (not shown in FIG. 6A). Accordingly, blocks 605 and 610 may be performed a plurality of times.

Based on the coordinates determined at block 610, a controller can calculate a transformation at block 615. In one embodiment, a transformation is determined when coordinates for enough points have been determined to calculate a complete transformation. In certain embodiments, a transformation may be calculated for a single point. As such, calculation of the transformation may be performed after data is collected for one or more measurement points. A complete transformation requires at least three control point measurements. In one embodiment, data collected for control points during setup of a surveying device, such as a surveying device (e.g., surveying device 105), may be employed for calculation of a transform.

Based on the transformation in block 620, a surveying controller may be calibrated at block 620. In on embodiment, calibration of the controller allows for the controller to perform one or more transformations based on one or more measured control points. When a complete transformation is determined by the controller, calibration may relate to setting the controller to output coordinates in a second coordinate system (e.g., local coordinate system) based on the calibration. Results of a transformation may be shown on a screen of a controller (e.g., screen 340). The transformation may be stored by the controller and applied to subsequent points that are measured.

According to another embodiment, site calibration of a surveying system may be based on previously completed site calibration. Referring now to FIG. 6B, process 650 may be employed to generate output coordinates based on a previously determined site calibration. In one embodiment, process 650 may be initiated after a complete transformation has been calculated for a survey site. Process 650 may be initiated by loading and/or selecting a site calibration by the survey controller (e.g., controller 125) at block 655. The survey controller may select the site calibration based on user input and/or position of the survey. A surveyor then measures a point (e.g., foresight 415) with a global positioning device at block 660. At block 665, the controller calculates a transformation of the point. Transformation of the point is based on the site calibration loaded and/or selected at block 655. The controller may then output and/or store point data (e.g., transformation coordinates, a measurement date/time, local coordinates, etc.) at block 670. One advantage of the invention is to facilitate subsequent station setups for a survey site when a site calibration is completed.

Figure 7:
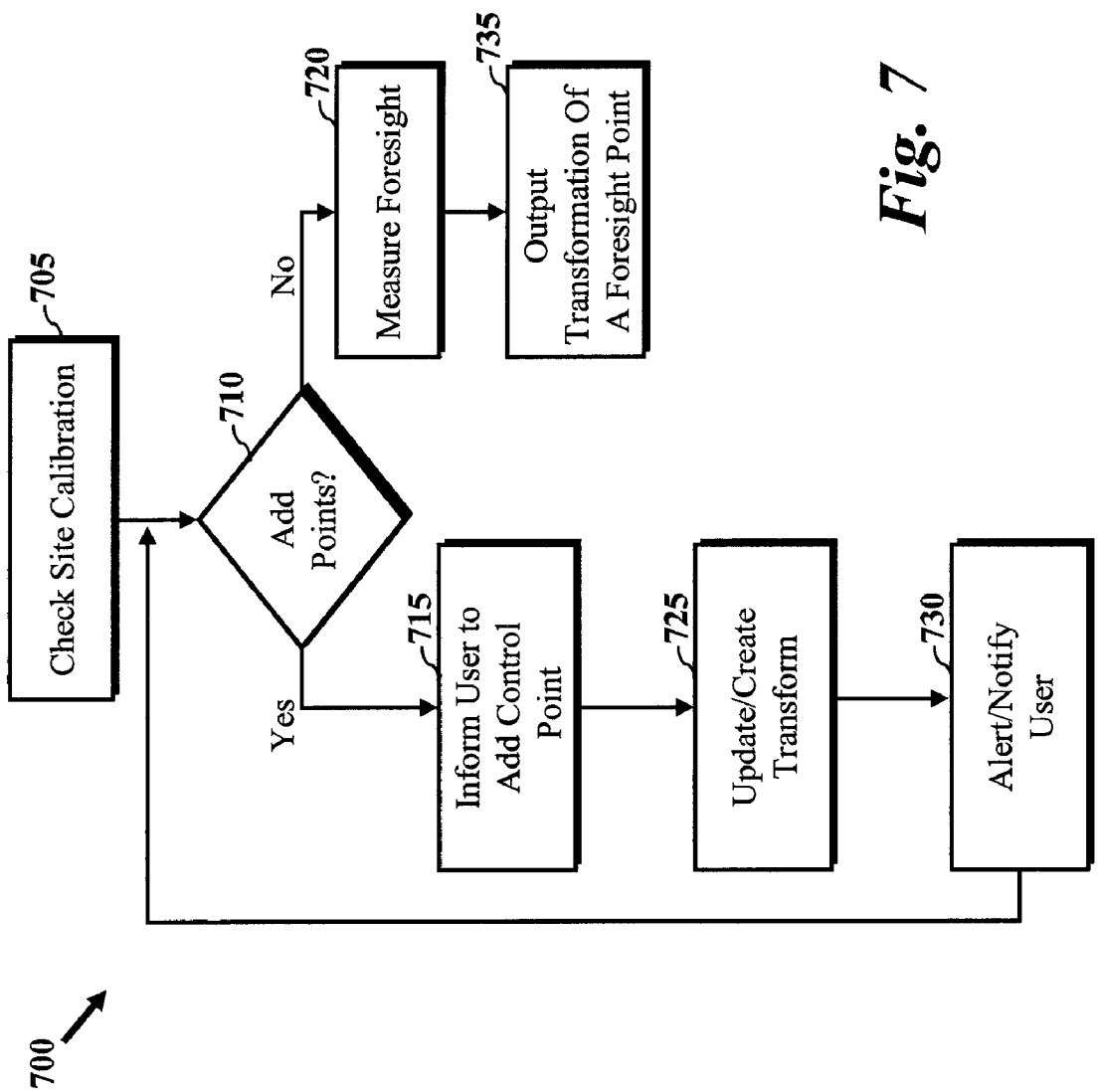
FIG. 7 depicts a process for site calibration of a surveying device according to one or more embodiments of the invention.
Figure 8:
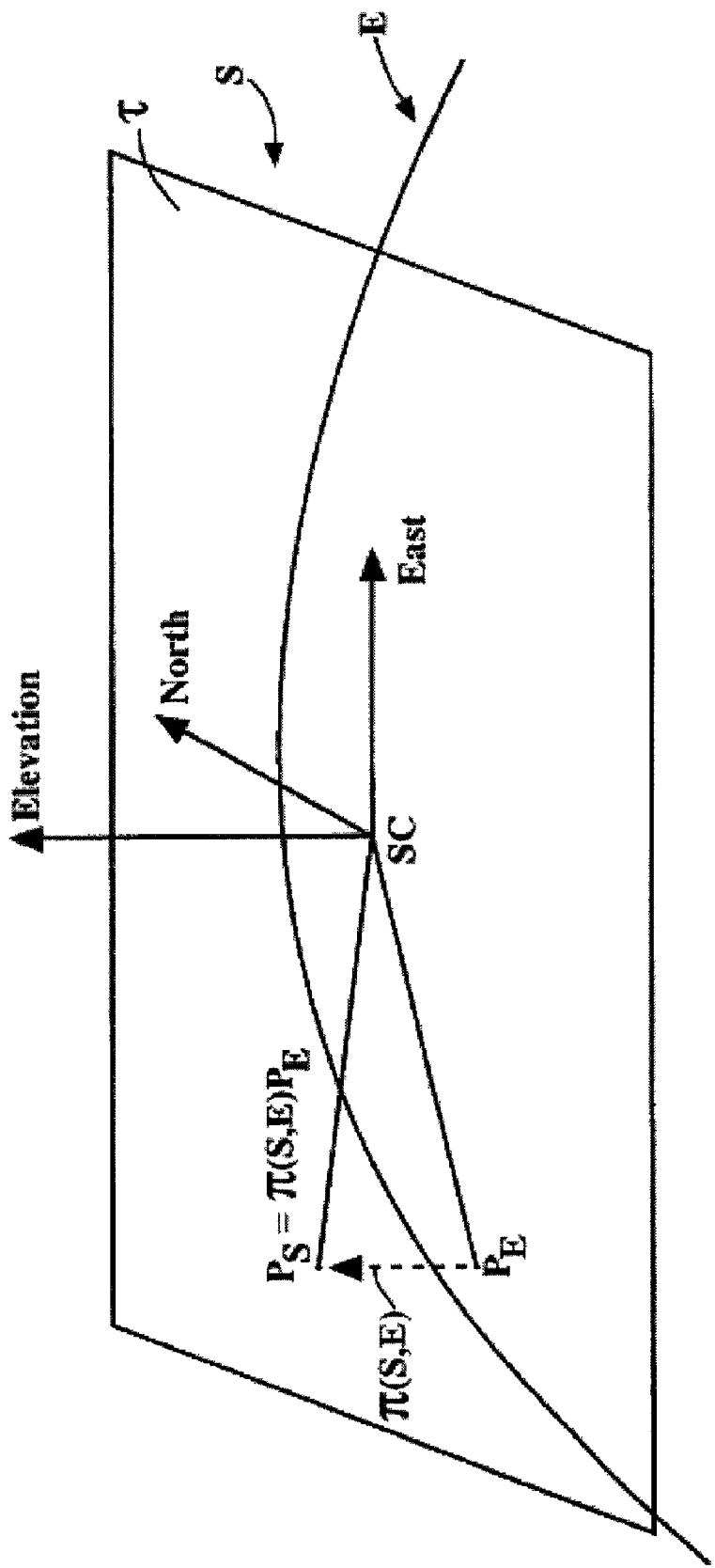
FIG. 8 depicts exemplary representation of local and global coordinate systems.

Referring now to FIG. 7, a process is shown which may be performed by a controller of a surveying system (e.g., controller 125) according to one or more embodiments of the invention. Process 700 may be initiated by a user of the controller initiating a survey. Alternatively, or in combination, process 700 may be automatically initiated by the controller. For example, process 700 may be automatically initiated when surveying data is collected. Process 700 may be initiated during setup up of a surveying device. In certain embodiments, process 700 may be initiated during a survey. The controller may check for previously determined site calibration data for a survey site at block 705. According to another embodiment, a surveying device (e.g., surveying device 105) may store location data of one or more site calibrations (e.g., control points $405_{1-n}$). At block 705, the controller can determine if site calibration data is available for the particular area. The controller may also alert a user when certain site calibrations have not been performed. As a result, errors for configuration of a surveying device may be reduced. Similarly, such functions may be utilized for training operators of a surveying device.

In one embodiment, the controller can determine location of the survey site using data entered by a user and/or data provided the global position device (e.g., global positioning device 110). The controller may further determine whether a complete site calibration exists. The controller determines whether additional observation measurements are required for the transformation at block 710. According to one embodiment of the invention, alerts may be provided to a user when a complete transformation has been determined by the controller. For example, a user may be required to measure at least three control points for a complete transformation. When the controller determines that additional points are required (e.g., "Yes" path out of block 710), the controller informs the user to provide an additional control point at block 715.

At block 725, the controller updates and/or creates the site calibration based on a transformation of the coordinate systems. As described in U.S. Pat. No. 5,774,826 to McBride, which is hereby fully incorporated by reference, survey coordinate transformations of a global system of survey coordinates may be transformed to a local system of coordinates in a location survey. U.S. Pat. No. 5,986,604, which is hereby incorporated by reference, discloses transformation from a first global coordinate system in a second global coordinate system. It may be appreciated that the controller of the instant invention may employ one or more methods as described in the '826 and '604 patents for calculation of a transformation. It may also be appreciated that the transformation may be updated and/or calibrated based on the process illustrated in FIG. 6A for performing site calibration.

At block 730, the controller can alert and/or notify the user that a site calibration has been updated. In certain embodiments, the controller can indicate that measurement of additional points may be required. In one embodiment, when transformation points are added to an existing transformation, coordinates of previously determined measurements could change. In certain embodiments, modifications of the calculations may be acceptable. However, in certain embodiments, such as stake out measurements, adding points to a transformation could change the position of previously determined markers. The controller may be configured to restrict a user and/or warn a user that the site calibration will not be modified after a transformation has been completed. When existing transformation requires modification due to an updated site calibration, the controller can notify a user at block 730. When the controller determines additional points are not needed (e.g., "No" path out of block 710), the controller can receive data for one or more foresight measurements at block 720. The controller can output a transformation of a foresight measurement at block 735.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for site calibration of a controller, the method comprising the acts of:
   determining coordinates of a point in a first coordinate system based on at least one measurement by a surveying device;
   determining coordinates of the point in a second coordinate system based on data provided by a global positioning device;
   calculating a transformation of the first coordinate system relative to the second coordinate system based on the coordinates determined for the point; and
   calibrating the controller based, at least in part, on the transformation.

2. The method of claim 1, wherein the first coordinate system is a local coordinate system and the second coordinate system is a global coordinate system.

3. The method of claim 1, wherein the transformation calculates an offset relative to the first and second coordinate systems when a single measurement point is employed in calculating the transformation.

4. The method of claim 1, wherein the transformation calculates offset, scale and orientation values relative to the first and second coordinate systems when a second measurement point is employed in calculating the transformation.

5. The method of claim 1, wherein the transformation calculates coordinate values in a first coordinate system corresponding to coordinates in a second coordinate system when at least three measurement points are employed in calculating the transformation.

6. The method of claim 1, wherein controller calibration relates to configuration of the controller to generate one or more of offset, scale and orientation values relative to the first and second coordinate systems for a foresight measurement.

7. The method of claim 1, further comprising:
   determining coordinates for additional points, wherein coordinates are determined in the first and second coordinate systems for each additional point; and
   recalculating the transformation based on the coordinates of the additional points.

8. The method of claim 1, further comprising determining coordinates for a second point by the global positioning receiver, wherein coordinates for the second point are in a second coordinate system, and outputting coordinates for the point in the first coordinate system based on the transformation.

9. The method of claim 1, further comprising:
   naming the point by the controller; and
   storing coordinates for the measurement point associated with the first and second coordinate systems with the named point.

10. The method of claim 1, further comprising performing one or more control point measurements for setup of the surveying device and calculating the transformation based on data associated with the one or more control point measurements.

11. The method of claim 1, wherein coordinates of the point in the first and second coordinate systems are determined simultaneously during setup of the surveying device.

12. A system comprising:
   a surveying device configured to measure a point in a first coordinate system;
   a global positioning device configured to determine coordinates of the point in second coordinate system; and
   a controller configured to interoperate with the surveying device and the global positioning device, wherein the controller is configured to:
      determine coordinates of the point in a first coordinate system based on at least one measurement by the surveying device;
      determine coordinates of the point in a second coordinate system based on data provided by the global positioning device;
      calculate a transformation of the first coordinate system relative to the second coordinate system based on the coordinates determined for the point; and
      calibrate the controller based, at least in part, on the transformation.

13. The system of claim 12, wherein the first coordinate system is a local coordinate system and the second coordinate system is a global coordinate system.

14. The system of claim 12, wherein the transformation calculates an offset relative to the first and second coordinate systems when a single measurement point is employed in calculating the transformation.

15. The system of claim 12, wherein the transformation calculates offset, scale and orientation values relative to the first and second coordinate systems when a second measurement point is employed in calculating the transformation.

16. The system of claim 12, wherein the transformation calculates coordinate values in a first coordinate system corresponding to coordinates in a second coordinate system when at least three measurement points are employed in calculating the transformation.

17. The system of claim 12, wherein controller calibration relates to configuration of the controller to generate one or more of offset, scale and orientation values relative to the first and second coordinate systems for a foresight measurement.

18. The system of claim 12, wherein the controller is further configured to:
   determine coordinates for additional points, wherein coordinates are determined in the first and second coordinate systems for each additional point; and
   recalculate the transformation.

19. The system of claim 12, wherein the controller is further configured to determine coordinates for a second point, wherein coordinates for the second point are in a second coordinate system by the global positioning receiver, and output coordinates for the point in the first coordinate system based on the transformation.

20. The system of claim 12, wherein the controller is further configured to:
   name the point; and
   store coordinates for the measurement point associated with the first and second coordinate systems with the named point.

21. The system of claim 12, wherein the surveying device is further configured to perform one or more control point measurements for setup of the surveying device and the controller is further configured to calculate the transformation based on data associated with the one or more control point measurements.

22. The system of claim 12, wherein coordinates of the point in the first and second coordinate systems are determined simultaneously during setup of the surveying device.

\* \* \* \* \*